United States Patent
Yoo

(10) Patent No.: US 10,893,032 B2
(45) Date of Patent: Jan. 12, 2021

(54) ENCRYPTION KEY MANAGEMENT SYSTEM FOR CLOUD SERVICES

(71) Applicant: SAMSUNG SDS CO., LTD., Seoul (KR)

(72) Inventor: In Seon Yoo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 211 days.

(21) Appl. No.: 15/994,266

(22) Filed: May 31, 2018

(65) Prior Publication Data

US 2018/0351928 A1 Dec. 6, 2018

(30) Foreign Application Priority Data

May 31, 2017 (KR) .......................... 10-2017-0067569

(51) Int. Cl.
*H04L 29/06* (2006.01)
*H04L 9/08* (2006.01)
*H04L 29/08* (2006.01)

(52) U.S. Cl.
CPC ............ *H04L 63/062* (2013.01); *H04L 9/085* (2013.01); *H04L 9/088* (2013.01); *H04L 9/0822* (2013.01);
(Continued)

(58) Field of Classification Search
CPC ..... H04L 63/062; H04L 63/064; H04L 67/10; H04L 9/0822; H04L 9/0838; H04L 9/085; H04L 9/088; H04L 9/0864
See application file for complete search history.

(56) References Cited

U.S. PATENT DOCUMENTS

| 9,191,200 | B1 * | 11/2015 | Adams | .................. | H04L 9/0891 |
| 2012/0140923 | A1 * | 6/2012 | Lee | ......................... | H04L 9/088 |
| | | | | | 380/45 |

(Continued)

FOREIGN PATENT DOCUMENTS

KR 10-2012-0132708 A 12/2012
KR 10-2013-0074225 A 7/2013
(Continued)

OTHER PUBLICATIONS

Mudhakar Srivatsa and Ling Liu, "Key Derivation Algorithms for Monotone Access Structures in Large File Systems", 2006, College of Computing, Georgia Institute of Technology, pp. 1-16. (Year: 2006).*

(Continued)

*Primary Examiner* — Joseph P Hirl
*Assistant Examiner* — Chi D Nguy
(74) *Attorney, Agent, or Firm* — Sughrue Mion, PLLC

(57) ABSTRACT

Provided is a system of encryption key management, which is used by a service provision server which provides a cloud service. The system comprises a key access server which encrypts the service key using a master key corresponding to the service key and provides the service key in response to a service key request from the service provision server and a master key management server which extracts a plurality of key fragments from the master key, processes the extracted key fragments to be stored in a distributed manner, and provides the master key reconstructed from the key fragments in response to a master key request from the key access server.

11 Claims, 14 Drawing Sheets

(52) U.S. Cl.
CPC .......... *H04L 9/0838* (2013.01); *H04L 9/0894* (2013.01); *H04L 63/064* (2013.01); *H04L 67/10* (2013.01)

(56) References Cited

U.S. PATENT DOCUMENTS

2017/0019385 A1    1/2017  Yoo
2018/0062835 A1*   3/2018  Hamel ................. H04L 9/3247

FOREIGN PATENT DOCUMENTS

KR    10-2016-0128170 A    11/2016
KR    10-2016-0139493       12/2016

OTHER PUBLICATIONS

A. Menezes et al., "Chapter 10, Identification and Entity Authentication", CRC Press, 1996, pp. 41 pages.
A. Menezes et al., "Chapter 12, Key Establishment Protocols", CRC Press, 1996, pp. 54 pages.
Communication dated Nov. 27, 2018, issued by the Korean Intellectual Property Office in counterpart Korean Application No. 10-2017-0067569.
Communication dated Mar. 25, 2019, issued by the Korean Intellectual Property Office in counterpart Korean Application No. 10-2017-0067569.

* cited by examiner

| No. | SERVICE KEY URI |
|---|---|
| 1 | /iHome/Seoul/Southpark/Service1 |
| 2 | /iHome/Seoul/Gumipark/Service2 |
| 3 | /iHome/Seoul/Southpark/Service3 |
| ... | ... |

| No. | SERVICE KEY URI | MASTER KEY |
|---|---|---|
| 1 | /iHome/Seoul/Southpark/Service1 | MASTER KEY A |
| 2 | /iHome/Seoul/Gumipark/Service2 | MASTER KEY B |
| 3 | /iHome/Seoul/Southpark/Service3 | MASTER KEY A |
| ... | ... | ... |

ENCRYPTION KEY MANAGEMENT SYSTEM FOR CLOUD SERVICES

This application claims the benefit of Korean Patent Application No. 10-2017-0067569, filed on May 31, 2017, in the Korean Intellectual Property Office, the disclosure of which is incorporated herein by reference in its entirety.

BACKGROUND

1. Field

The present disclosure relates to an encryption key management system for cloud services, and more particularly, to a system for managing encryption keys used to encrypt or decrypt cloud data in order to improve the security of cloud services.

2. Description of the Related Art

With the widespread deployment of the cloud computing-based IT environment, enterprises and public organizations have begun to recognize the cloud computing environment as an essential environment for utilization and integration of information system resources. In addition, as individuals use various cloud services illustrated in FIG. 1 in the Internet and mobile environments, their awareness of the cloud computing environment has increased. The biggest issue that has emerged as the cloud computing environment replaces the traditional IT environment is cloud security.

A cloud service is an on-demand outsourcing service that provides tenants with various IT resources such as servers, storage, and software. Therefore, security issues are inevitable. In addition, although it seems externally that an independent service is provided for each tenant of the cloud service, since physical resources are shared internally, a strong security system is essential to provide the cloud service commercially.

Due to the security issues, cloud service providers basically provide confidentiality of data stored in cloud storage using encryption technology. However, even if the encryption technology is used, the confidentiality of data ultimately depends on the confidentiality of an encryption key. Therefore, a separate encryption key management system capable of safely managing a plurality of encryption keys is essentially required in order to provide cloud services commercially.

SUMMARY

Aspects of the present disclosure provide an encryption key management system which can ensure security of a cloud service by securely managing a service key used to encrypt or decrypt data of the cloud service and a master key used to encrypt the service key.

Aspects of the present disclosure also provide an encryption key management system which can securely manage service keys and master keys and has improved processing performance for multiple service key requests However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided an encryption key management system providing a service key used by a service provision server which provides a cloud service, the system comprising a key access server which encrypts the service key using a master key corresponding to the service key and provides the service key in response to a service key request from the service provision server and a master key management server which extracts a plurality of key fragments from the master key, processes the extracted key fragments to be stored in a distributed manner, and provides the master key reconstructed from the key fragments in response to a master key request from the key access server.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
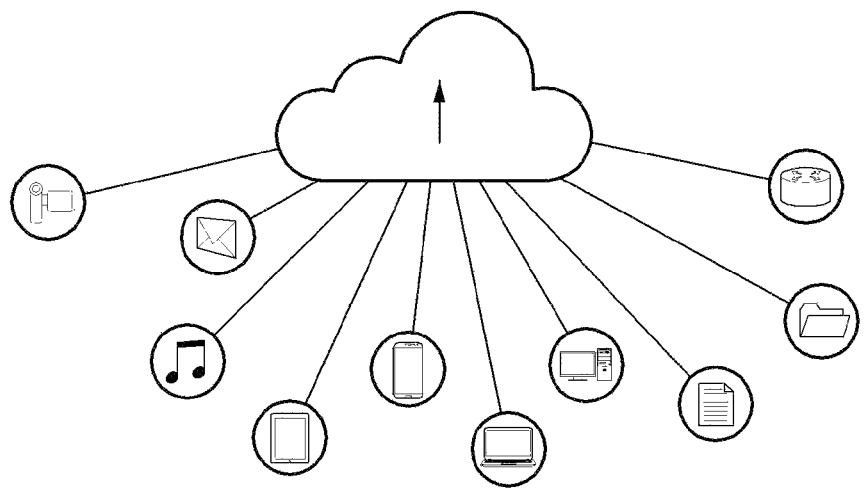
FIG. 1 is a conceptual diagram illustrating cloud services that can be provided in a cloud computing environment.

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise". "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Prior to the description of this specification, some terms used in this specification will be defined.

A cloud service, as used herein, refers to an on-demand outsourcing service that provides tenants with various IT resources such as servers, storage, and software. For example, a cloud service providing storage is a service that allows tenants to store various data in a storage space of a service provision server connected to a network and to download the stored data through the network when necessary. The cloud service may be, but is not limited to, an infrastructure as a service (IaaS) that provides a virtualized infrastructure environment to tenants or software as a service (SaaS) that provides application software through the Internet.

A service key, as used herein, refers to a key used to encrypt or decrypt data by an instance executed for the provision of a cloud service. The service key may be set to have a different value for each tenant of a cloud service, for each cloud service, and the like. In addition, the service key may have, but not limited to, a different size or type for each tenant of a cloud service, for each cloud service, and the like.

A master key, as used herein, refers to a key used to encrypt or decrypt a service key. The master key may be generated to have, but not limited to, a different value for each tenant of a cloud service, for each cloud service or each business related to a cloud service, and the like.

A tenant, as used herein, refers to a user or a group of users who use a cloud service. For example, the tenant may be an individual user or a corporate user including a plurality of users.

Hereinafter, embodiments of the present disclosure will be described in detail with reference to the accompanying drawings.

Figure 2:
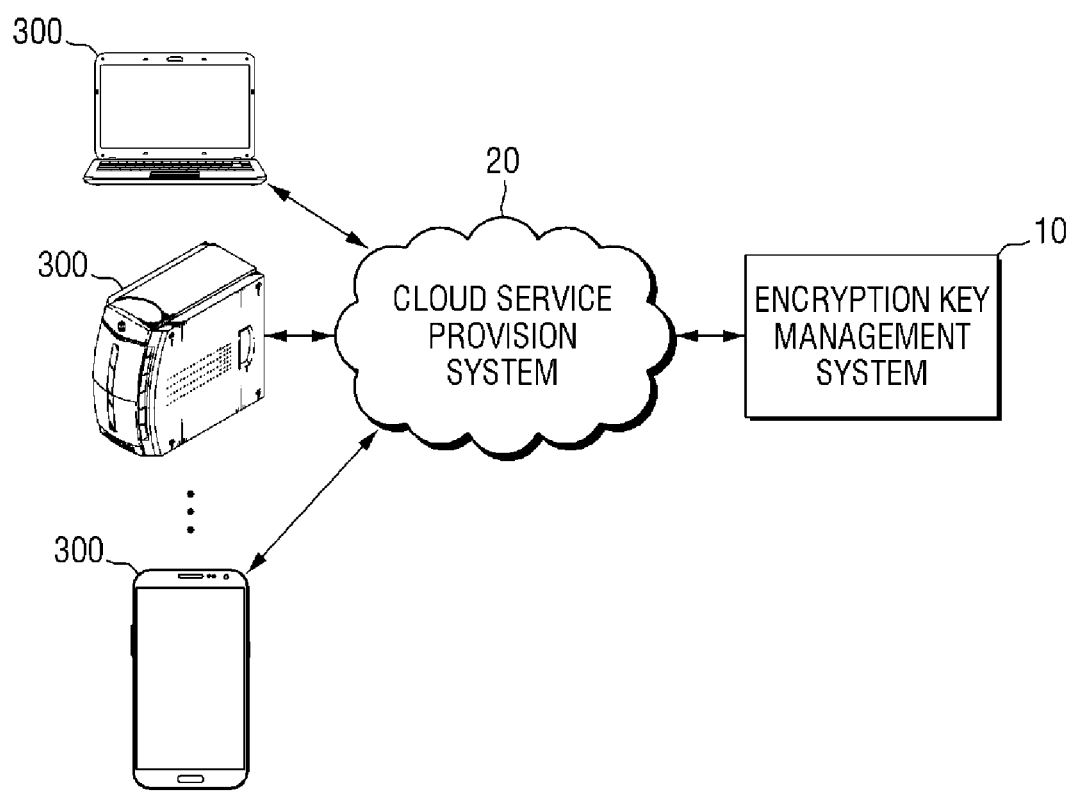
FIG. 2 illustrates an exemplary cloud environment to which the present disclosure can be applied.

FIG. 2 illustrates an exemplary cloud environment to which the present disclosure can be applied.

Referring to FIG. 2, the exemplary cloud environment to which the present disclosure can be applied includes an encryption key management system 10, a cloud service provision system 20, and tenant terminals 300. In FIG. 2, a plurality of tenants using cloud services are illustrated as an example.

In the exemplary cloud environment, the encryption key management system 10 according to an embodiment is a key management system that manages a service key for ensuring the confidentiality of data stored in the cloud service provision system 20 and a master key for ensuring the confidentiality of the service key.

The encryption key management system 10 encrypts and manages a service key using a master key and provides the service key in response to a service key request from the cloud service provision system 20. The encryption key management system 10 will be described in more detail later with reference to FIGS. 3 through 6.

In the exemplary cloud environment, the cloud service provision system 20 is a system that provides various cloud services to the tenant terminals 300 through a network. The cloud service provision system 20 may provide an independent cloud service (e.g., storage, software, etc.) for each tenant based on virtualization and distributed processing technology.

The cloud service provision system 20 may receive a service key from the encryption key management system 10 and encrypt or decrypt cloud data using the service key to provide the confidentiality of the data. A detailed description of the cloud service provision system 20 will be omitted in order not to obscure the point of the present disclosure.

In the exemplary cloud environment, the tenant terminals 300 are computing devices that use various cloud services provided by the cloud service provision system 20. Here, the computing devices may be notebook computers, desktop computers, laptop computers, or smartphones. However, the computing devices are not limited to these examples and can be any kind of device having a computing unit and a communication unit.

The tenant terminals 300 can use cloud services anytime and anywhere through the network. For example, a tenant terminal 300 can upload or download a file to or from a storage space provided by the cloud service provision system 20 through the network. Here, the file uploaded to the storage space may be encrypted using a service key and stored accordingly.

In the exemplary cloud environment, the encryption key management system 10, the cloud service provision system 20, and the tenant terminals 300 may communicate with each other through the network. Here, the network may be implemented as any kind of wired/wireless network such as a local area network (LAN), a wide area network (WAN), a mobile radio communication network, or a wireless broadband Internet (Wibro).

Until now, the exemplary cloud environment to which the present disclosure can be applied has been briefly described with reference to FIG. 2. Encryption key management systems 10 according to embodiments will now be described with reference to FIGS. 3 through 6.

Figure 3:
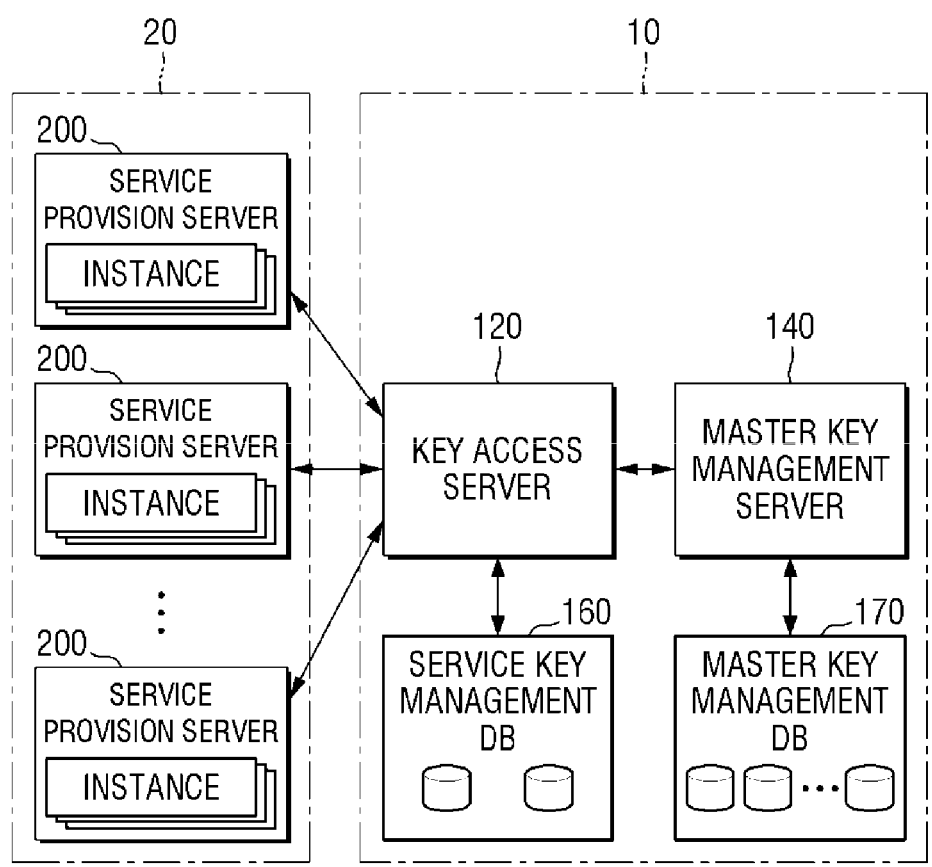
FIGS. 3 through 6 illustrate encryption key management systems according to embodiments.

FIG. 3 is a block diagram of an encryption key management system 10 according to a first embodiment.

Referring to FIG. 3, the encryption key management system 10 may include a key access server 120, a master key management server 140, a service key management database (DB) 160, and a master key management DB 170. In FIG. 3, components only related to the embodiment are illustrated. Therefore, it will be understood by those of ordinary skill in the art to which the present disclosure pertains that other general-purpose components can be included in addition to the components illustrated in FIG. 3. In addition, it should be noted that the components of the encryption key management system 10 illustrated in FIG. 3 are functionally distinct components and that one or more components can be integrated with each other in an actual physical environment. Each component of the encryption key management system 10 will now be described.

The key access server 120 manages service keys used to ensure the confidentiality of cloud data and provides a corresponding service key in response to a service key request from a service provision server 200. A method of providing a service key will be described in detail later with reference to FIG. 8.

In the first embodiment, a salt based on the validity duration of a service key may be used in order to prevent a security threat such as sniffing in a service key transmission section between the key access server 120 and a service provision server 200. A service key transmission method using the salt will be described later with reference to FIGS. 15 through 17.

In the first embodiment, the key access server 120 may encrypt and manage a service key using a corresponding master key. More specifically, the key access server 120 may encrypt a service key using a corresponding master key and store the encrypted service key in the service key management DB 160 by matching the encrypted service key with an identifier of the corresponding master key. Here, once the service key is encrypted, the master key may be removed from the key access server 120.

In the first embodiment, the key access server 120 may request the master key management server 140 to provide a master key using an identifier of the master key and may receive the master key corresponding to the identifier. The master key is used to encrypt or decrypt a service key as described above.

The master key management server 140 manages master keys used to ensure the confidentiality of service keys and provides a corresponding master key to the key access server 120 in response to a master key request from the key access server 120.

In the first embodiment, the master key management server 140 may extract a plurality of key fragments from a master key and store the key fragments in the master key management DB 170 in a distributed manner. Once the key fragments are extracted, the master key may be removed.

In the first embodiment, the master key management server 140 may reconstruct a master key from a plurality of key fragments in response to a master key request from the key access server 120 and provide the reconstructed master key to the key access server 120. Here, at least one algorithm well known in the art may be used to extract a plurality of key fragments from a master key or to reconstruct the master key. For example, a master key may be reconstructed from a plurality of key fragments using Lagrange interpolation or secret sharing having a threshold (e.g., threshold secret sharing).

In the current embodiment, not only a plurality of key fragments are stored in a distributed manner, but also a master key is removed once the key fragments are extracted. Therefore, the master key is not stored in any device within the system 10. Hence, according to the current embodiment, the confidentiality of the master key can be ensured.

The service key management DB 160 is a DB that stores a service key encrypted using a master key. More specifically, the service key management DB 160 may store an encrypted service key received from the key access server 100 and/or an identifier of a master key corresponding to the encrypted service key. Depending on embodiments, the service key management DB 160 may further store, but not limited to, an identifier of a service key, an identifier of a tenant using a cloud service, and a service key usage history. Furthermore, the service key management DB 160 may be implemented as, but not limited to, a NoSQL DB that does not have a fixed schema.

In some embodiments, a service key may be assigned not only a first identifier uniquely identifying the service key, but also a second identifier indicating the category of the service key. This will be described in detail later with reference to FIGS. 9 through 14.

In FIG. 3, the service key management DB 160 is illustrated as being an independent component from the key access server 120. However, it will be obvious to those of ordinary skill in the art that the service key management DB 160 may also be a component of the key access server 120.

The master key management DB 170 is a DB that stores a plurality of key fragments extracted from a master key in a distributed manner. More specifically, the master key management DB 170 may distribute a plurality of key fragments received from the master key management server 140 into a plurality of DBs. Depending on embodiments, the master key management DB 170 may further store, but not limited to, an identifier of a master key, an identifier of a tenant of a cloud service, an identifier of a service key, a generation date and time of a master key, and a hash value of a master key. Further, the master key management DB 170 may be implemented as, but not limited to, a relational DB in which a certain relationship exists between tables.

In FIG. 3, the master key management DB 170 is illustrated as being an independent component from the master key management server 140. However, it will be obvious to those of ordinary skill in the art that the master key management DB 170 may also be a component of the master key management server 140.

For ease of understanding, the cloud service provision system 20 will be briefly described.

The cloud service provision system 20 may include at least one service provision server 200. In FIG. 3, a case where a plurality of service provision servers 200 exist is illustrated as an example.

A service provision server 200 is a server that provides a cloud service. More specifically, the service provision server 200 may create at least one virtual machine virtualized through a hypervisor. Then, the service provision server 200 may execute an application or application instance for a cloud service through the virtual machine.

In the first embodiment, an instance of the service provision server 200 may encrypt data of a cloud service using a service key. The service provision server 200 may transmit a service key to the key access server 120 without storing the service key in a device and request the key access server 120 to protect the service key. To provide cloud data in response to a request from a tenant terminal 300, the service provision server 200 may receive a service key from the key access server 120, decrypt the cloud data using the service key, and provide the cloud data.

The service provision server 200 may transmit or receive data to or from the key access server 120 using a secure protocol such as Secure Sockets Layer (SSL) and/or Transport Layer Security Protocol (TLS).

Until now, the encryption key management system 10 according to the first embodiment has been described. According to the first embodiment, a service key and a master key may be stored in separate DBs and may be processed by separate computing devices. That is, service key management and master key management may be fundamentally performed separately. Thus, the cloud service security provided by the encryption key management system 10 can be further improved.

An encryption key management system 10 according to a second embodiment will now be described with reference to FIG. 4.

Figure 4:
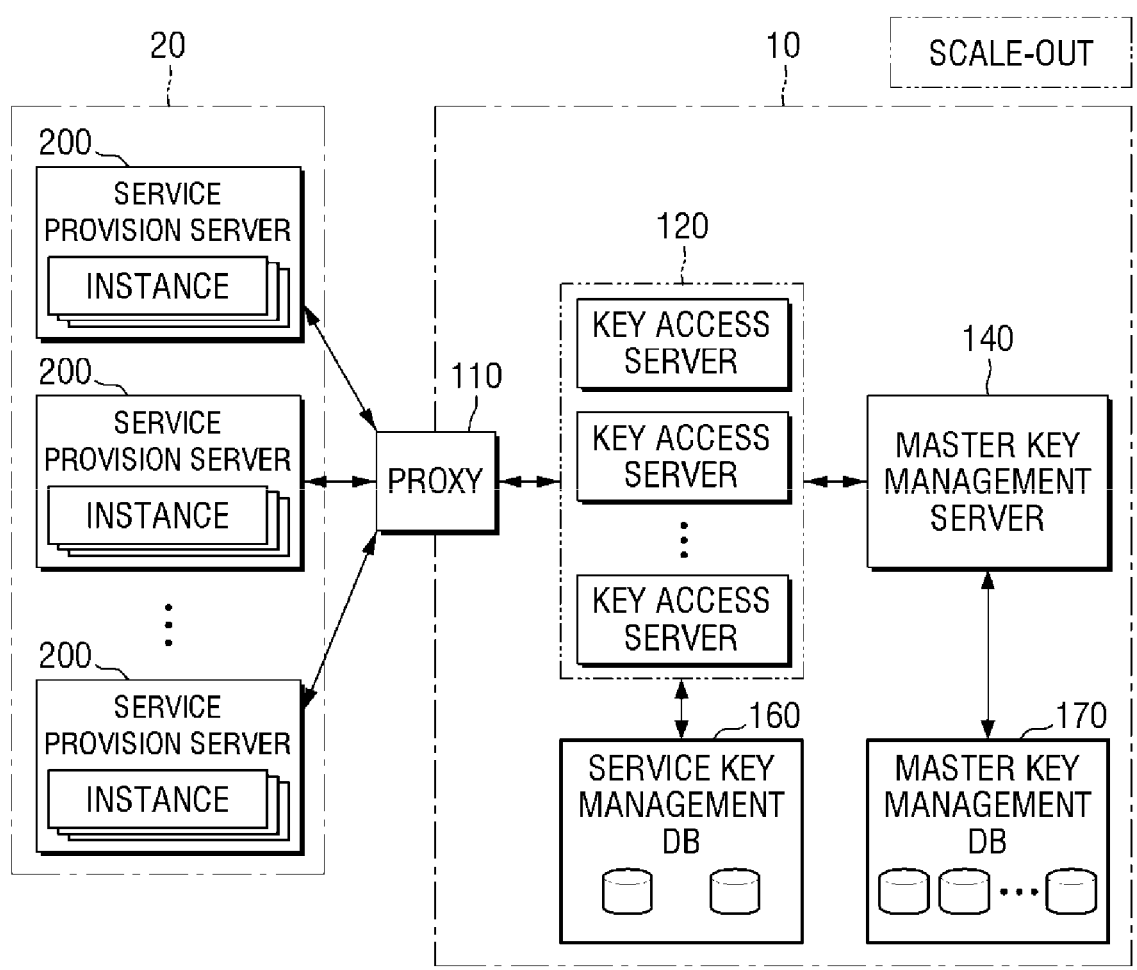

Referring to FIG. 4, the encryption key management system 10 according to the second embodiment may include a plurality of key access servers 120. In addition, the key access servers 120 may be configured in a scale-out structure to process a service key request from a service provision server 200 in parallel.

Since the key access servers 120 are configured in a scale-out structure, the encryption key management system 10 may further include a proxy 110 or a load balancer for distributing a service key request to the key access servers 120. Depending on embodiments, the proxy 110 may distribute a received service key request in consideration of the state of each key access server 120. Here, examples of the state may include, but are not limited to, the failure or non-failure, load, and processing performance of each key access server 120.

According to the second embodiment, since the key access servers 120 are configured in a scale-out structure, not only the processing performance of the encryption key management system 10 is improved, but also a single point of failure (SPOF) problem is solved, thereby improving the availability and reliability of the encryption key management system 10.

An encryption key management system 10 according to a third embodiment will now be described with reference to FIG. 5.

Figure 5:
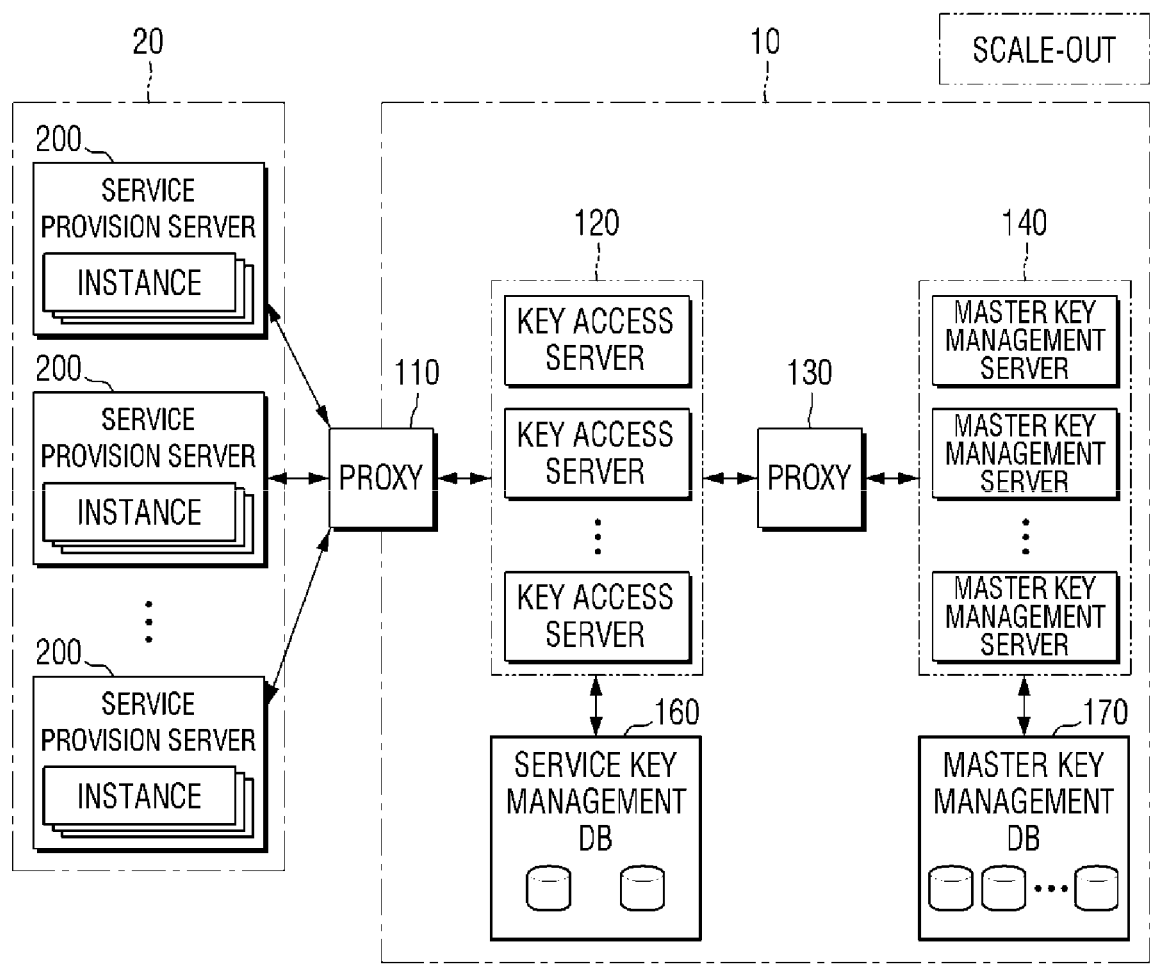

Referring to FIG. 5, in the third embodiment, the encryption key management system 10 may include a plurality of master key management servers 140. In addition, the master key management servers 140 may be configured in a scale-out structure to process a master key request from a key access server 120 in parallel.

Since the master key management servers 140 are configured in a scale-out structure, the encryption key management system 10 may include a proxy 130 or a load balancer for distributing a master key request to the master key management servers 140. Depending on embodiments, the proxy 130 may distribute a received master key request in consideration of the state of each master key management server 140. Here, examples of the state may include, but are not limited to, the failure or non-failure, load, and processing performance of each master key management server 140.

According to the third embodiment, since the master key management servers 140 are also configured in a scale-out structure, the processing performance of the encryption key management system 10 can be further improved. For example, when only key access servers 120 are configured in a scale-out structure, a bottleneck phenomenon may occur in the master key management servers 140. However, since the bottleneck phenomenon can be solved according to the third embodiment, the overall processing performance of the encryption key management system 10 can be improved. In addition, since the SPOF problem of the master key management servers 140 is solved, the availability and reliability of the encryption key management system 10 can be further improved.

An encryption key management system 10 according to a fourth embodiment will now be described with reference to FIG. 6.

Figure 6:
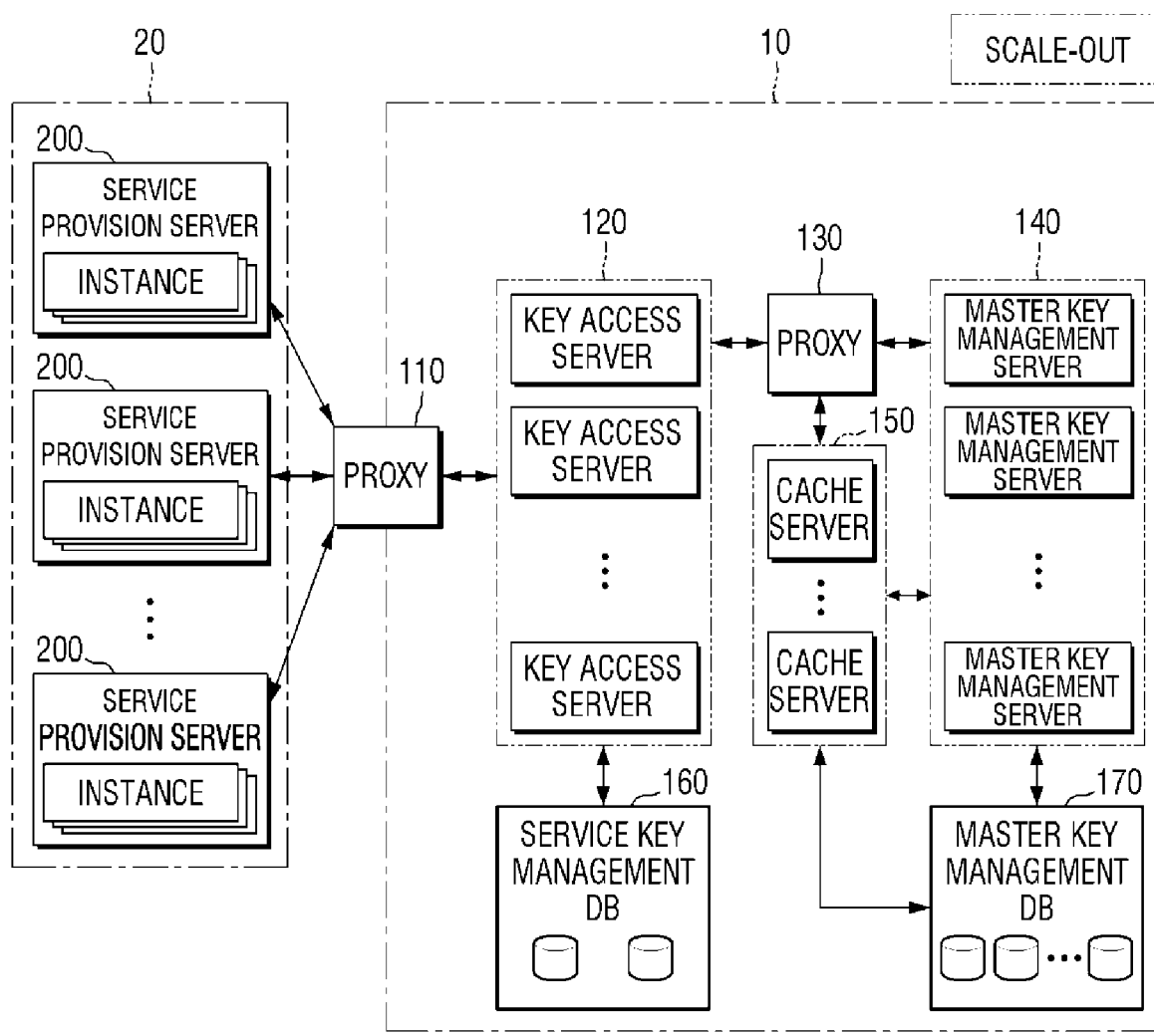

Referring to FIG. 6, in the fourth embodiment, the encryption key management system 10 may further include a cache server 150. Depending on embodiments, the cache server 150 may be implemented as a distributed cache configured in a scale-out structure.

The cache server 150 may cache a master key according to a preset caching policy. The caching policy may be, but is not limited to, Least Recently Used (LRU).

A master key is cached because a relatively large amount of computing and time cost is required in the process of reconstructing the master key. For example, in order to reconstruct a master key, a plurality of key fragments must be retrieved from a plurality of DBs included in the master key management DB 170. This may cause multiple DB accesses, and a considerable amount of computing cost may be required to reconstruct the master key from the key fragments.

In the fourth embodiment, the cache server 150 may encrypt a master key. In addition, the cache server 150 may store the encrypted master key by matching the master key with an identifier of the master key.

According to the fourth embodiment, a frequently used master key may be cached, and the cached master key may be immediately provided (e.g., a cache hit) in response to a master key request received from a key access server 120. Therefore, the average processing speed of the encryption key management system 10 can be improved.

Until now, the encryption key management systems 10 according to the embodiments have been described with reference to FIGS. 3 through 6. Each component of FIGS. 3 through 6 may be, but is not limited to, a software component or a hardware component such as a Field Programmable Gate Array (FPGA) or Application Specific Integrated Circuit (ASIC). A component may advantageously be configured to reside on the addressable storage medium and configured to execute on one or more processors. The functionality provided for in the components may be further separated into additional components or combined into a single component that performs certain functions.

The exemplary hardware configuration of a key access server 120 or a master key management server 140 will now be described with reference to FIG. 7.

The key access server 120 or the master key management server 140 can be implemented as any computing device including a computing unit and a communication unit. However, the key access server 120 or the master key management server 140 may be implemented as a high-performance server computing device. The exemplary hardware configuration of the computing device is as illustrated in FIG. 7.

Figure 7:
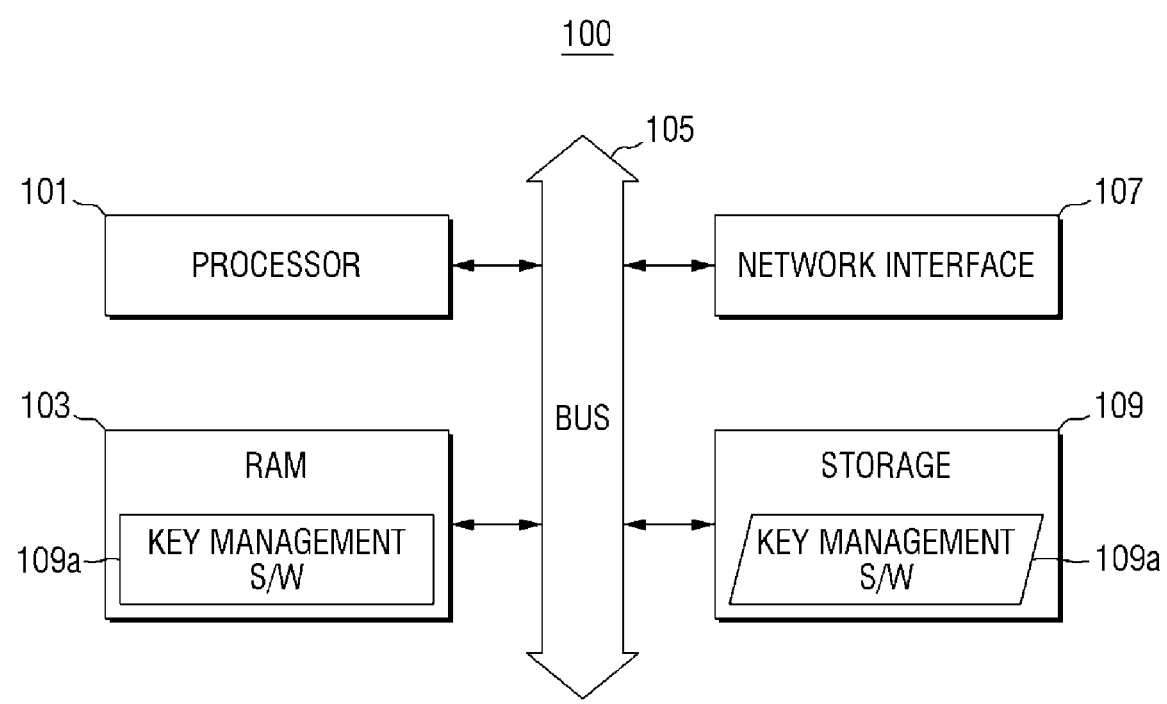
FIG. 7 illustrates the exemplary hardware configuration of a key access server or a master key management server constituting an encryption key management system according to an embodiment.

Referring to FIG. 7, the computing device may include one or more processors 101, a bus 105, a network interface 107, a memory 103 which loads a computer program to be executed by the processors 101, and a storage 109 which stores encryption key management software 109*a*. In FIG. 7, components only related to the embodiment are illustrated. Therefore, it will be understood by those of ordinary skill in the art to which the present disclosure pertains that other general-purpose components can be included in addition to the components illustrated in FIG. 7.

The processors 101 control the overall operation of each component of the computing device. The processors 101 may include a central processing unit (CPU), a microprocessor unit (MPU), a micro-controller unit (MCU), a graphic processing unit (GPU), or any form of processor well known in the art to which the present disclosure pertains. In addition, the processors 101 may perform an operation on at least one application or program for executing a method according to embodiments. The computing device may include one or more processors.

The memory 103 stores various data, commands and/or information. The memory 103 may load one or more programs 109*a* from the storage 109 to execute an encryption key management method according to embodiments. In FIG. 7, a random access memory (RAM) is illustrated as an example of the memory 103.

The bus 105 provides a communication function between the components of the computing device. The bus 105 may be implemented as various forms of buses such as an address bus, a data bus and a control bus.

The network interface 107 supports wired and wireless Internet communication of the computing device. In addition, the network interface 107 may support various communication methods as well as Internet communication. To this end, the network interface 107 may include a communication module well known in the art to which the present disclosure pertains.

The storage 109 may non-temporarily store the programs 109*a*. In FIG. 7, the key management software 109*a* is illustrated as an example of the programs 109*a*.

The storage 109 may include a non-volatile memory such as a read only memory (ROM), an erasable programmable ROM (EPROM), an electrically erasable programmable ROM (EEPROM) or a flash memory, a hard disk, a removable disk, or any form of computer-readable recording medium well known in the art to which the present disclosure pertains.

The encryption key management software 109a may be loaded into the memory 103 and executed by the processors 101 to perform a service key and/or master key provision method, a service key and/or master key management method, a service key transmission method, etc. according to an embodiment. This will be described later with reference to FIGS. 8 through 17.

Until now, the exemplary hardware configuration of the computing device for implementing the key access server 120 or the master key management server 140 has been described with reference to FIG. 7.

For ease of understanding, a method by an encryption key management system 10 provides a service key will now be described with reference to FIG. 8.

Figure 8:
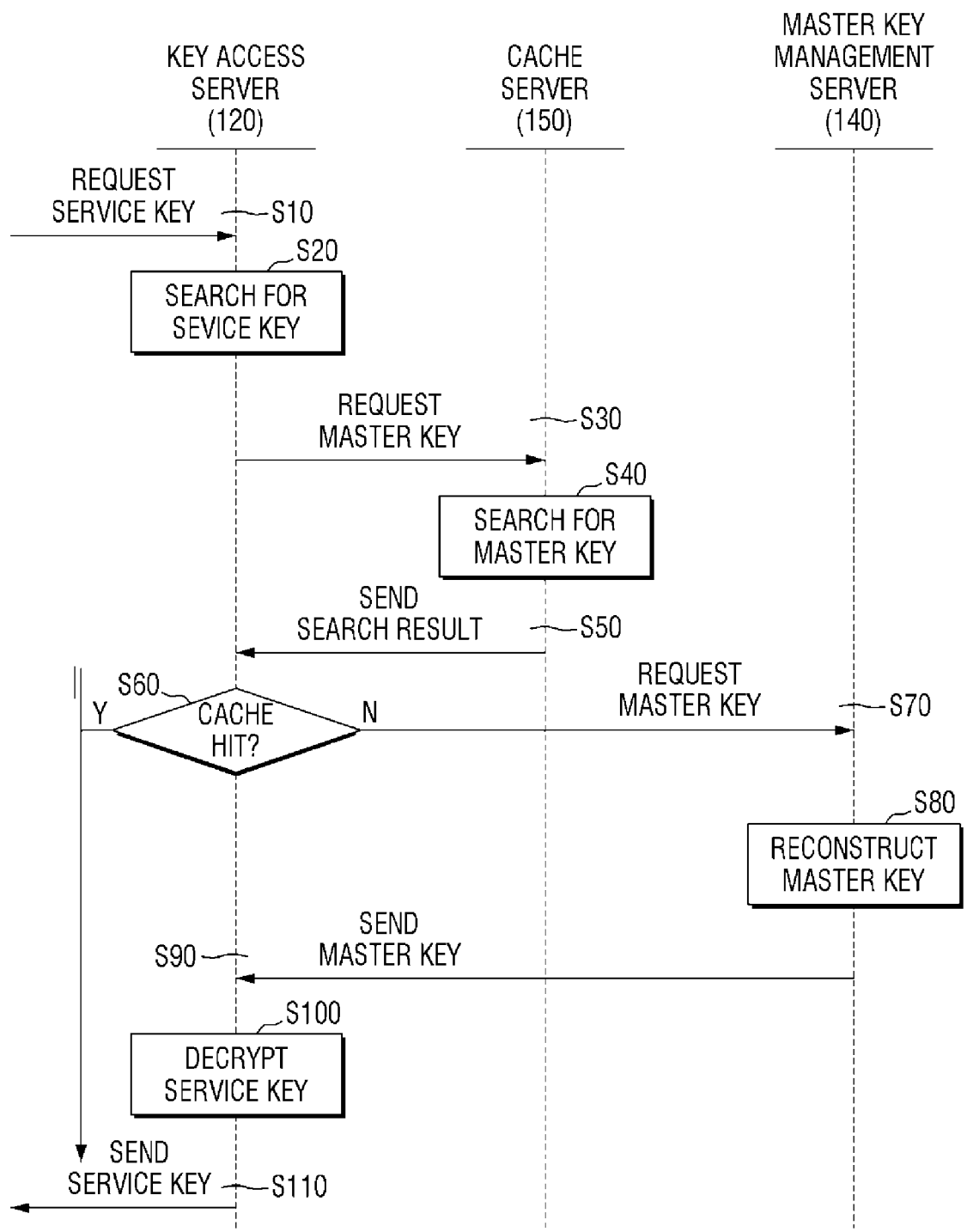
FIG. 8 is a flowchart illustrating a service key provision method according to an embodiment.

FIG. 8 is a flowchart illustrating a service key provision method according to an embodiment. However, this is merely an embodiment for achieving the objectives of the present disclosure, and some operations can be added or removed if necessary.

For ease of description, the subject of each operation included in the service key provision method may be omitted. In addition, each operation included in the service key provision method may be an operation of a computer program executed by a processor included in the subject of the operation.

Referring to FIG. 8, a key access server 120 receives a service key request from a service provision server 200 (operation S10). Depending on embodiments, the service key request may be forwarded from a proxy 110.

In response to the service key request, the key access server 120 searches a service key management DB 160 for a service key (operation S20). For example, the key access server 120 may search for the service key using, but not limited to, an identifier of a tenant included in the service key request, an identifier of the service provision server 200, or an identifier of the service key. As a result of the search, the key access server 120 may obtain the encrypted service key and an identifier of a master key corresponding to the encrypted service key.

In order to decrypt the encrypted service key, the key access server 120 requests the cache server 150 to search for a cached master key and receives the search result (operations S40 and S50).

In the case of a cache hit, the key access server 120 decrypts the encrypted service key using the cached master key and transmits the decrypted service key to the service provision server 200 (operations 560. S100 and S110). Here, salt-based encryption may be performed to securely transmit the decrypted service key, and this will be described later with reference to FIGS. 15 through 17.

In the case of a cache miss, the key access server 120 transmits a master key request to a master key management server 140 (operation S70). Depending on embodiments, the master key request may first be forwarded to a proxy 130 and then forwarded from the proxy 130 to an available master key management server 140.

In response to the master key request, the master key management server 140 may obtain a plurality of key fragments from a master key management DB 170 and reconstruct a master key using the obtained key fragments.

Here, for example, an identifier of the master key may be used to retrieve the key fragments. When the master key is reconstructed, the master key management server 140 sends the reconstructed master key to the key access server 120 (operation S90).

Here, the reconstructed master key may be encrypted and cached in the cache server 150, depending on embodiments.

When receiving the reconstructed master key, the key access server 120 decrypts the service key using the master key and sends the decrypted service key to the service provision server 200 (operation S100 and 110).

Until now, the service key provision method performed by the encryption key management system 10 has been described with reference to FIG. 8. A service key and/or encryption key management method that can be referred to in some embodiments of the present disclosure will now be described with reference to FIGS. 9 through 14.

When a plurality of service keys used to encrypt or decrypt cloud data are stored in the service key management DB 160, a first identifier for identifying each service key may be assigned to each service key. The first identifier may be non-redundantly assigned to each service key. For example, the first identifier may be used to retrieve a service key from the service key management DB 160. The first identifier may be, but not necessarily, automatically assigned by the service key management DB 160.

According to an embodiment, each service key may be assigned a second identifier indicating a category of the service key, in addition to the first identifier. Here, the category may be set to correspond to, but not limited to, a target cloud service, a tenant, etc. related to the service key. The second identifier may be assigned by, but not limited to, the key access server 120.

For reference, the first identifier is not allowed to be redundantly assigned to one or more service keys, but the second identifier may be allowed to be redundantly assigned to one or more service keys. That is, the same second identifier may be assigned to at least one service key belonging to the same category.

According to an embodiment, the category of the service key may be composed of a plurality of layers. Accordingly, the second identifier may be expressed in a hierarchically structured format. For example, the second identifier may be expressed in a uniform resource indicator (URI) format. For more specific example, referring to FIG. 9, if the category is composed of a plurality of layers and the category of a service key is 'C₃,' the second identifier assigned to the service key may be '/A1/B2/C3.' In the following description, it will be assumed that the second identifier of a service key is expressed in a URI format. However, the format in which the second identifier is expressed can be changed as desired.

Figure 10:
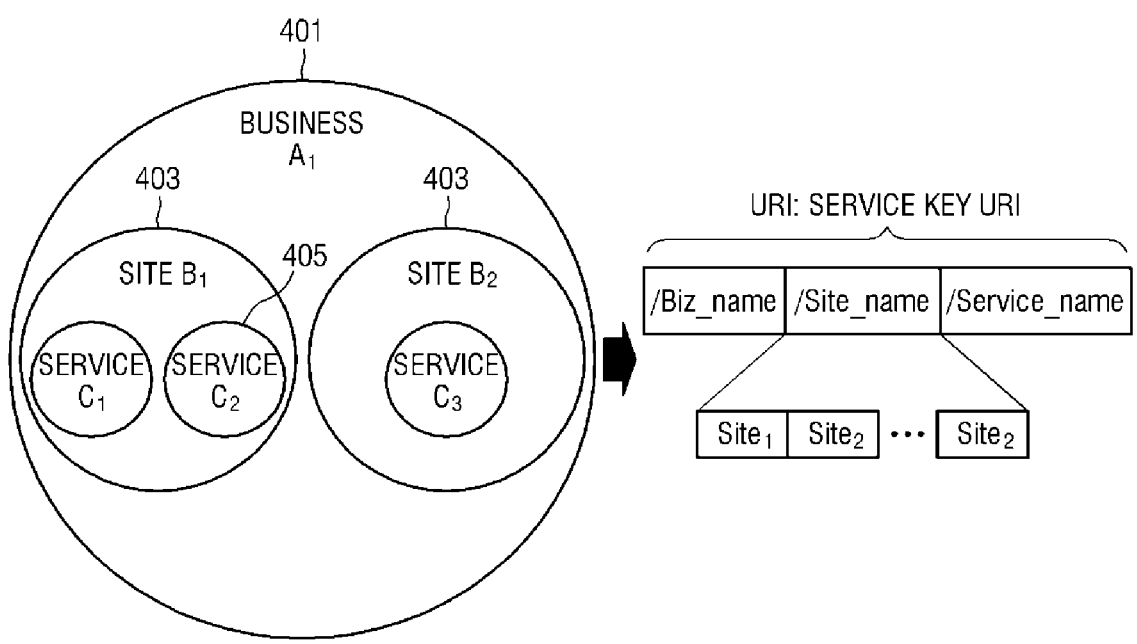

FIG. 10 illustrates an example of hierarchical categories of service keys.

Referring to FIG. 10, the category of each service key may be set using a business (401), a site (403), and a cloud service (405). Here, the business may be a comprehensive meaning indicating a top-level domain, the site may be a site providing the business, and the service may be various kinds of cloud services provided by the site.

Figures 11, 12:
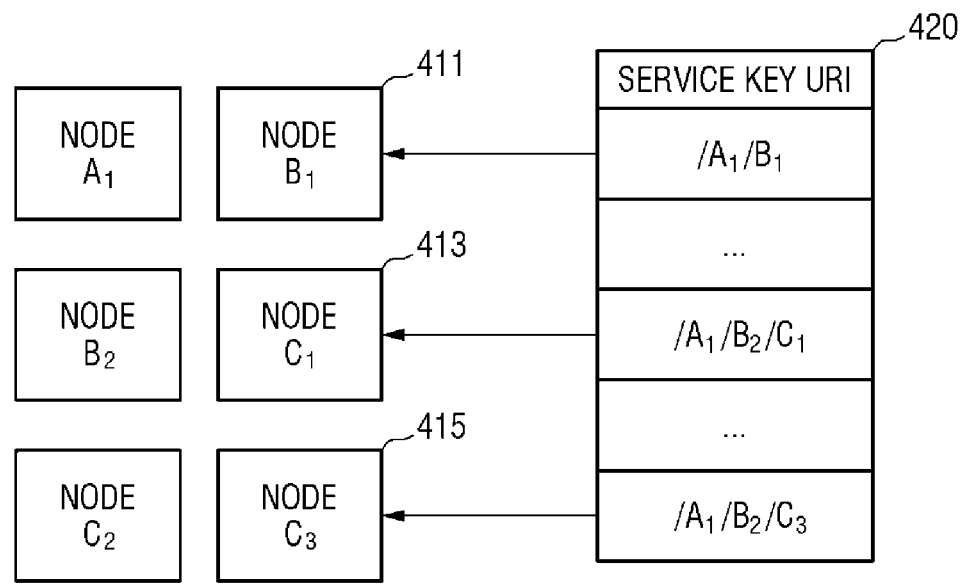

When a first layer corresponds to the business, a second layer corresponds to the site, and a third layer corresponds to the cloud service in a hierarchical order as illustrated in FIG. 10, the second identifier of a service key may be assigned as illustrated on the right side of FIG. 10. Here, each of the first layer, the second layer and the third layer may be composed of a plurality of sub-layers. For example, as illustrated in FIG. 10, a site may be composed of a plurality of sub-sites. Examples of the second identifier assigned to service keys are illustrated in FIG. 11.

In another example, a plurality of category layers may be configured such that a first layer corresponds to a tenant, a second layer corresponds to a domain within the tenant, and a third layer corresponds to a service within the domain.

According to an embodiment, the second identifier of a service key may be used as an index indicating the storage location of the service key in the service key management DB 160. To this end, the schema of the service key management DB 160 may be constructed to correspond to each category of service keys. This will be described with reference to FIG. 12.

Figure 9:
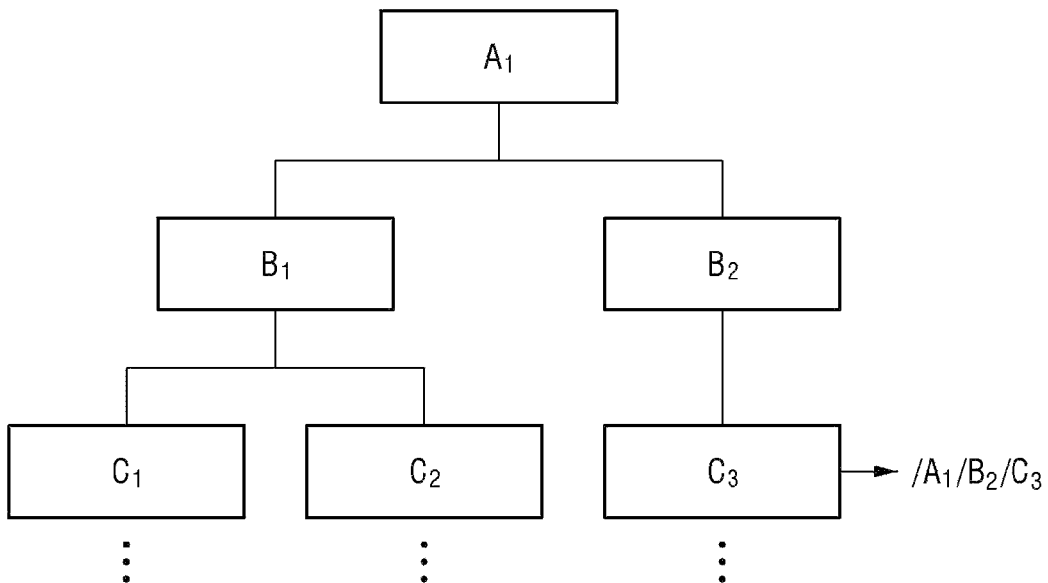
FIGS. 9 through 14 are diagrams for explaining a service key and master key management method that can be referred to in some embodiments.

Assuming that a hierarchy of categories of service keys is as illustrated in FIG. 9 and that the service key management DB 160 is implemented as a NoSQL DB, each data node of the service key management DB 160 may be configured to correspond to each category. For example, a data node 411 may correspond to category $B_1$ and a data node 413 may correspond to category $C_1$. Here, a service key belonging to a category corresponding to each data node may be stored.

Once the service key management DB 160 is established in the above manner, it is possible to quickly access a data node storing a service key by using the second identifier (420) of the service key. For example, when the second identifier of a first service key is "/$A_1$/$B_1$," it can be identified that the storage location of the first service key is the data node 411. Therefore, the first service key can be obtained by directly accessing the data node 411 without referring to other data nodes. For another example, when the second identifier of a second service key is "/$A_1$/$B_2$/$C_1$," it can be identified that the storage location of the second service key is the data node 413. Therefore, the second service key can be obtained by directly accessing the data node 413 without referring to other data nodes.

In this way, when the schema of the service key management DB 160 is configured according to each category of service keys, the number of DB accesses can be minimized because a data node storing a service key can be directly accessed using the second identifier of the service key. Accordingly, the performance of the encryption key management system 10 can be improved.

According to an embodiment, a master key can be set in various ways using the categories of service keys. This will now be described with reference to FIGS. 13 and 14.

Figures 13, 14:
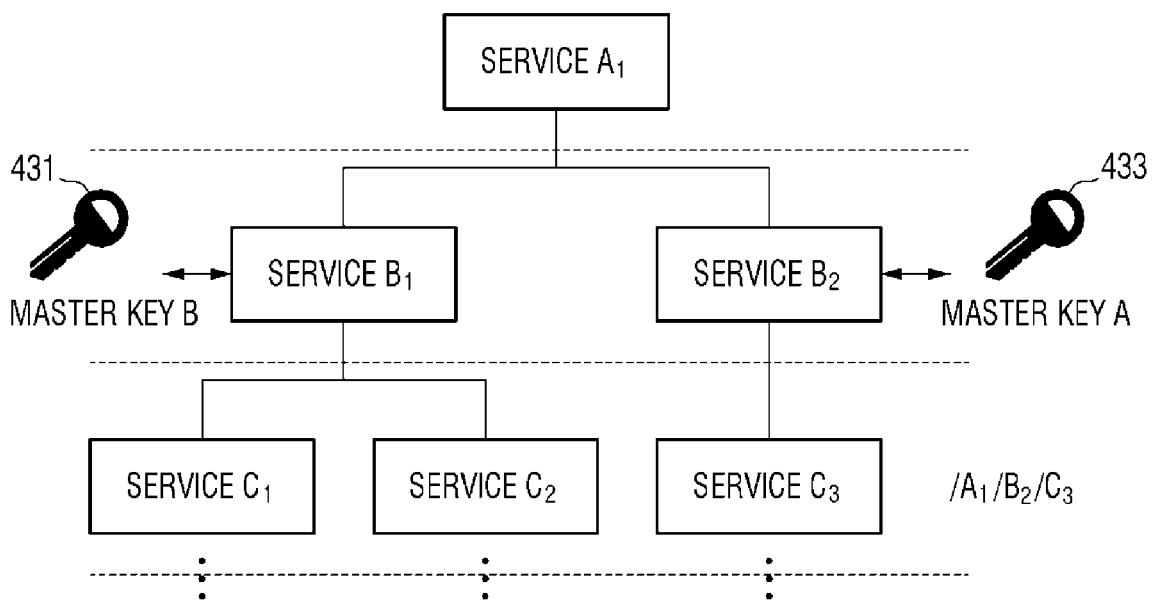

Referring to FIG. 13, assuming that the categories of service keys are divided into business, site, and service layers, a master key may be set for each business, site, or service. For example, when a master key is set for each site, a service key corresponding to the category of site $B_1$ may be encrypted using a master key 431, and a service key corresponding to the category of site $B_2$ may be encrypted using a master key 433.

That is, if a reference layer for setting a master key is determined, a master key may be set for each category located in the reference layer. Here, the reference layer may be an upper layer or a lower layer. When the upper layer is set as the reference layer, the number of master keys may be reduced because multiple service keys correspond to the same master key. In this case, ease of master key management can be increased. In contrast, when the lower layer is set as the reference layer, the number of service keys corresponding to one master key is reduced. In this case, ease of master key management may be reduced, but service keys can be managed more securely.

FIG. 14 illustrates an example of the correspondence relationship between service keys and master keys when the reference layer is set to sites. Referring to FIG. 14, service keys 1 and 3 belonging to the category of site 'Seoul/SouthPark' correspond to master key A, and service key 2 belonging to the category of site 'Seoul/GumiPark' corresponds to master key B.

In the same manner, if tenants of a cloud service are included in at least one of a plurality of category layers of service keys and the reference layer is set to a layer indicating the classification of the tenants, a master key may be set for each tenant. In this case, a service key used for a first tenant may be encrypted and managed using a first master key, and a service key used for a second tenant may be encrypted and managed using a second master key.

In addition, if cloud services are included in at least one of a plurality of category layers of service keys and the reference layer is set to a layer indicating the classification of the cloud services, a master key may be set for each cloud service. In this case, a service key used for a first cloud service may be encrypted and managed using a first master key, and a service key used for a second cloud service may be encrypted and managed using a second master key.

In summary, a master key can be variously set for each tenant, each service, etc. by setting the master key to correspond to any one of a plurality of category layers of service keys. Until now, the service key and master key management method has been described with reference to FIGS. 9 through 14. A salt-based service key transmission method that can be referred to in some embodiments will now be described with reference to FIGS. 15 through 17.

Figure 15:
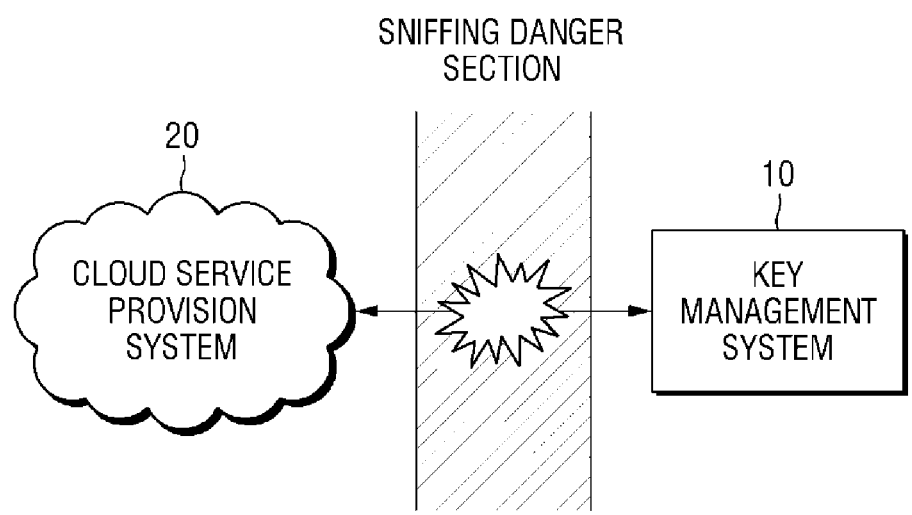
FIGS. 15 through 17 are diagrams for explaining a salt-based service key transmission method that can be referred to in some embodiments.

Referring to FIG. 15, a network section between the cloud service provision system 20 and the encryption key management system 10 may be a dangerous section in which a security threat such as sniffing may occur. Various security measures (e.g., firewall installation, private network establishment, etc.) may be provided within the encryption key management system 10 by an administrator, but not in the network section between the cloud service provision system 20 and the encryption key management system 10. Therefore, the network security of the section must be considered in order to solve the security issue of cloud services.

According to an embodiment, a salt based on the validity duration of a service key may be used in order to prevent the security threat. The current embodiment will now be described in detail with reference to FIGS. 16 and 17.

Figure 16:
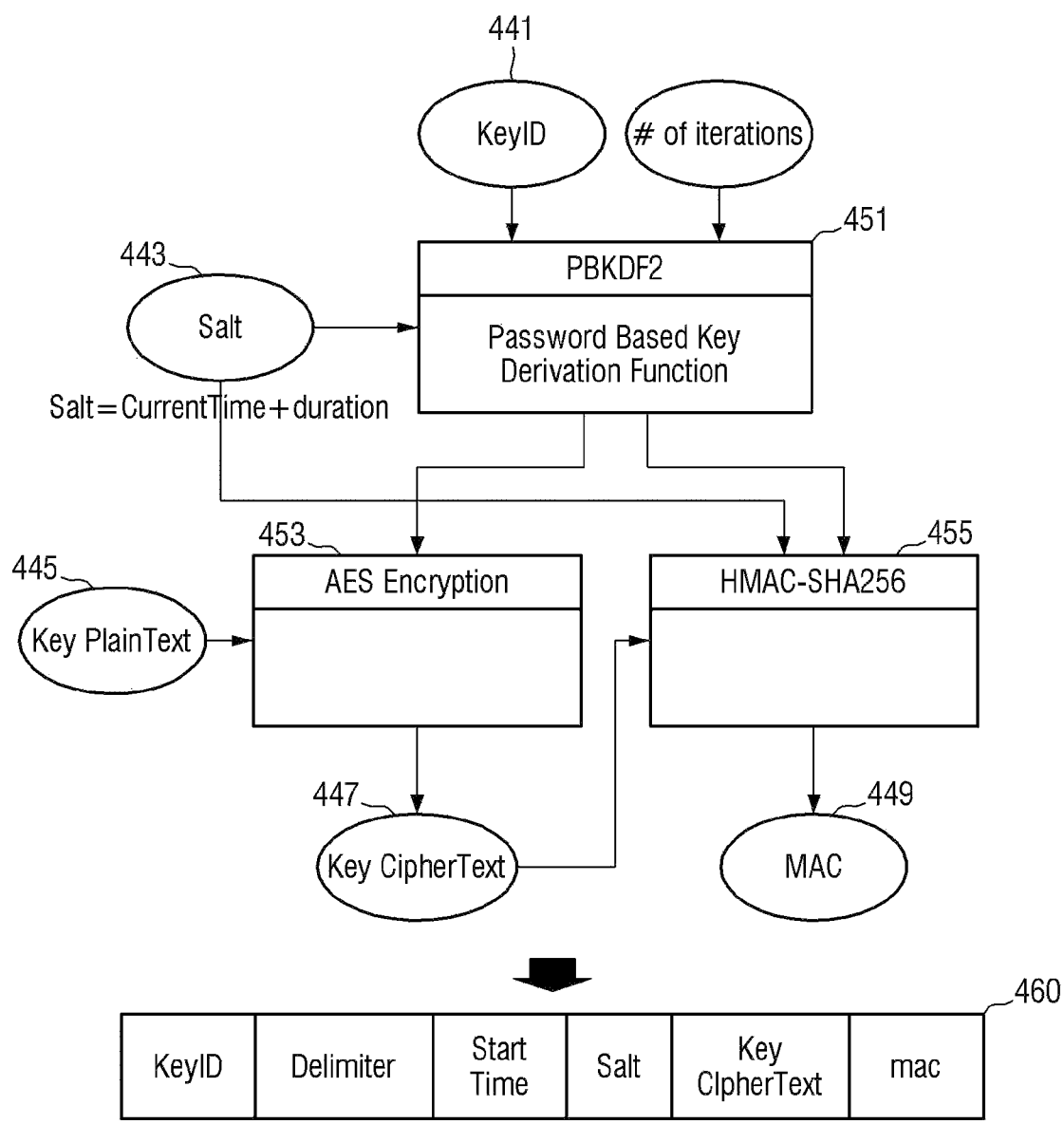

Referring to FIG. 16, the key access server 120 may generate a salt 443 based on the validity duration of a service key, derive an encryption key using the salt 443, and encrypt the service key using the encryption key.

More specifically, the key access server 120 may derive an encryption key using a first identifier 441 of a service key and the salt 443. Here, the encryption key may be derived using an encryption key derivation algorithm such as, but not limited to, a password based key derivation function (PBKDF) 451. In addition, the value of the salt 443 may be set to, but is not limited to, the sum of a first value indicating a current time and a second value indicating the validity duration of the service key.

Once the encryption key is derived, the key access server 120 may encrypt the service key (445) using the encryption key. In FIG. 16, the service key is encrypted using an advanced encryption standard (AES) 453. However, the service key can be encrypted not just using the AES 453, but using any encryption algorithm.

In addition, the key access server 120 may transmit a message authentication code (MAC) 449 to the service provision server 200 in order to ensure data integrity. In FIG. 16, the MAC 449 is generated using SHA-256 455. However, the MAC 449 can be generated not just using SHA-256 455 but in any manner.

More specifically, the key access server 120 may generate a first MAC by hashing the derived encryption key and the salt 443, generate a second MAC by hashing the encrypted service key (key ciphertext), and then transmit the first MAC and the second MAC to the service provision server 200. Here, the key access server 120 may also transmit, for example, the identifier 441 of the service key, a delimiter, and a start time of the salt 443 to the service provision server 200.

Figure 17:
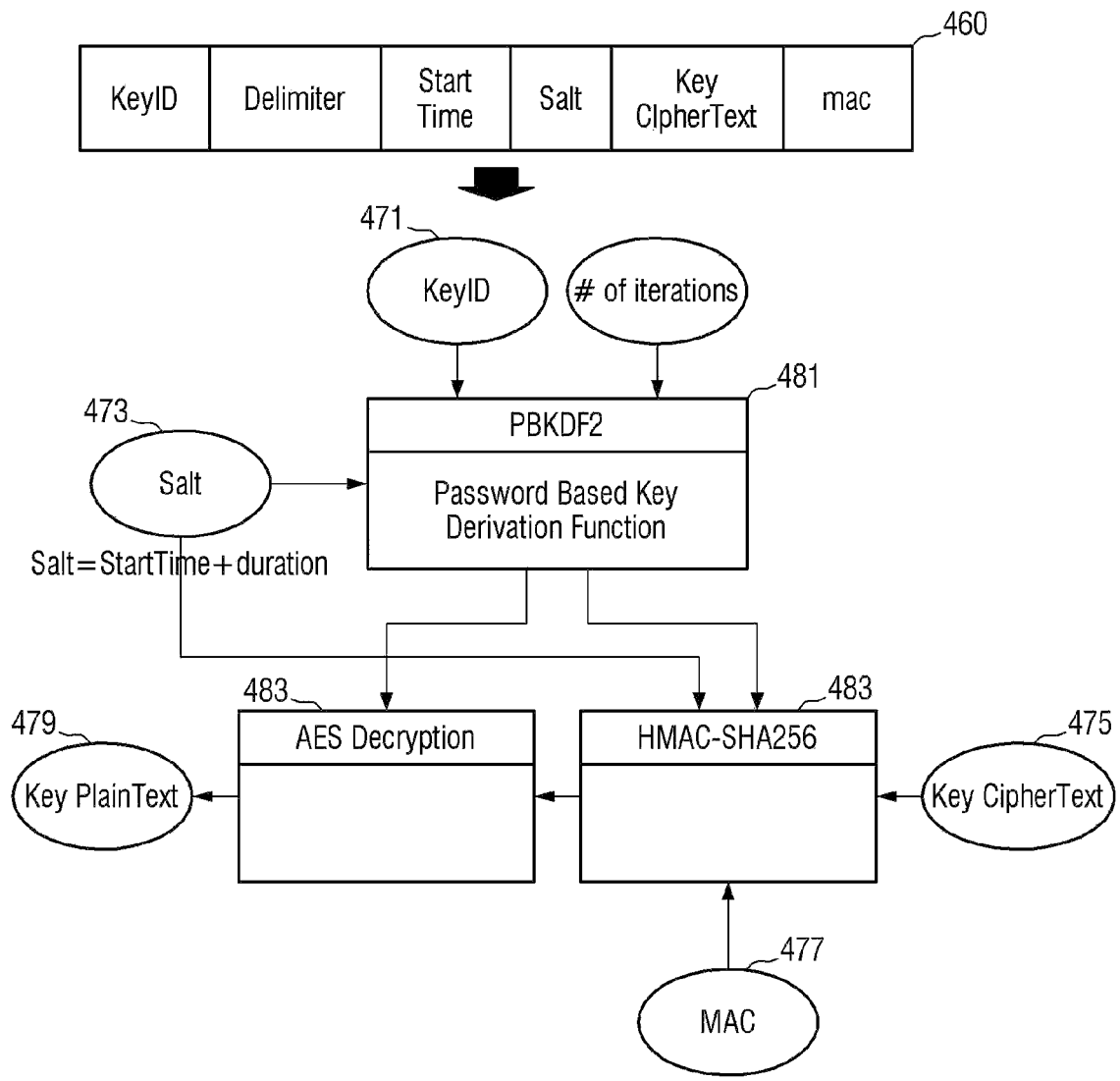

A process in which the service provision server 200 decrypts a received service key will now be described with reference to FIG. 17.

The service provision server 200 may derive an encryption key using an identifier 471 of an encrypted service key 475 and a salt 473 received together with the encrypted service key 475. Prior to this, the service provision server 200 compares the salt 473 with a current time and determines whether the received service key 475 is valid based on the comparison result. More specifically, when a first value indicating the current time is smaller than a second value indicating the value of the salt 473, the service provision server 200 may determine that the service key 475 is invalid and may not proceed any further.

In the opposite case, the service provision server 200 may determine that the received service key 475 is valid. Thus, the service provision server 200 may derive an encryption key by performing an encryption key derivation algorithm 481 and decrypt the encrypted service key 475 using the encryption key.

Before decrypting the encrypted service key 475, the service provision server 200 may check the integrity of the encrypted service key 475 based on a received MAC 477. In addition, the service provision server 200 may check the integrity of the salt 473 before comparing the salt 473 with the current time. For example, the integrity of the salt 473 may be checked using a first MAC, and the integrity of the encrypted service key 475 may be checked using a second MAC.

Finally, the service provision server 200 may decrypt the service key 475 using the derived encryption key and decrypt data of a cloud service using the decrypted service key (key plaintext) 479.

Until now, the salt-based service key transmission method has been described with reference to FIGS. 15 through 17. According to the above-described embodiment, not only a service key can be transmitted after being encrypted, but also, even if the service key is leaked due to sniffing or the like, more than a certain level of security can be provided according to the validity duration assigned to the service key.

According to an embodiment, a different security service may be provided to each tenant. For example, even for the same cloud service, a different security service may be provided depending on the service fee paid by a tenant.

Specifically, in the case of a first tenant paying a high fee, the validity duration of a service key in a salt may be set to be short. In addition, a reference layer for master key management may be set to a lower layer, the length of a master key may be increased, and a stronger algorithm may be used as an encryption algorithm.

In addition, a faster security service may be provided to the first tenant, depending on embodiments. For example, the proxy 110 may give a high priority to a service key request from the first tenant and make the service key request be processed according to the priority. In addition, a master key for the first tenant may be processed to reside in the cache server 150, so that the master key can be provided quickly.

According to the present disclosure, a service key and a master key may be stored in separate DBs and may be processed by separate computing devices. That is, service key management and master key management may be fundamentally performed separately. Thus, the security of a cloud service can be improved.

In addition, a service key for securing the confidentiality of cloud data may be encrypted and managed using a master key, and the master key may be stored in a distributed manner in the form of a plurality of key fragments. Moreover, since the master key is not stored in any server or device, the confidentiality of the service key and the master key can be ensured.

Also, a service key may be encrypted using a salt containing the valid duration of the service key, and the encrypted service key may be transmitted to a service provision server that requested the service key. Accordingly, even if the service key is leaked by sniffing or the like in a network section through which the service key is transmitted, more than a certain level of security can be ensured.

In addition, a key access server and/or a master key management server may be configured in a scale-out structure. Accordingly, the overall processing performance of an encryption key management system can be improved, and the reliability and availability of the encryption key management system can be increased.

Further, a master key may be cached using a cache server. Accordingly, the computing cost and time cost required to reconstruct the master key can be reduced, and the processing performance of the encryption key management system can be further improved.

Also, by using a second identifier assigned to a service key as an index, it is possible to minimize the number of DB accesses and quickly obtain a service key stored in a service key management DB. Accordingly, the processing performance of the encryption key management system can be further improved.

In addition, the second identifier may be assigned to each service key according to a hierarchical category, and service keys belonging to the same category may be made to correspond to the same master key. Therefore, the number of master keys managed can be reduced. Further, a master key can be managed for each cloud service or each tenant by setting the category of service keys to cloud services provided or tenants. Accordingly, ease of master key management can be increased.

However, the effects of the embodiments are not restricted to the one set forth herein. The above and other effects of the embodiments will become more apparent to one of daily skill in the art to which the embodiments pertain by referencing the claims.

The concepts of the invention described above with reference to FIGS. 5 to 18 can be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. An encryption key management system comprising:
a key access server comprising a first processor configured to:
encrypt a service key based on a master key corresponding to the service key,
in response to a service key request from a service provision server that provides a cloud service, provide the encrypted service key to the service provision server,
and
assign an identifier indicating a category corresponding to the service key; and
a master key management server comprising a second processor configured to:
extract a plurality of key fragments from the master key,
store the plurality of key fragments in a distributed manner, and
in response to a master key request from the key access server, provide, to the key access server, the master key reconstructed from the plurality of key fragments;
wherein the category is composed of a plurality of layers,
wherein any one of the plurality of layers is set as a reference layer used for master key management, and
wherein the service key of a lower layer belonging to the reference layer is encrypted and stored using a first master key.

2. The encryption key management system of claim 1, wherein the master key is removed from the master key management server after the plurality of key fragments are extracted.

3. The encryption key management system of claim 1, further comprising:
a service key management database configured to store the encrypted service key received from the key access server; and
a master key management database comprising a plurality of databases and configured to distribute the plurality of key fragments received from the master key management server into the plurality of databases,
wherein the service key management database is a NoSQL database, and the master key management database is a relational database.

4. The encryption key management system of claim 1, wherein the key access server is configured in a scale-out structure in which a plurality of servers are configured to process the service key request in parallel, and
wherein the encryption key management system further comprises a proxy configured to distribute the service key request to the plurality of servers.

5. The encryption key management system of claim 1, wherein the master key management server is configured in a scale-out structure in which a plurality of servers are configured to process the master key request in parallel, and
wherein the encryption key management system further comprises a proxy configured to distribute the master key request to the plurality of servers.

6. The encryption key management system of claim 1, further comprising a cache server configured to:
cache the master key according to a predetermined caching policy, and
in response to the service key request, provide the cached master key.

7. The encryption key management system of claim further comprising a NoSQL-based service key management database configured to store the service key, the NoSQL-based service key management database comprising a plurality of data nodes,
wherein each of the plurality of data nodes corresponds to the category,
wherein the service key corresponding to the category is stored in each of the plurality of data nodes, and
wherein the identifier is used as an index for the service key stored in each of the plurality of data nodes.

8. The encryption key management system of claim 1, wherein a specific category located in the reference layer corresponds to a tenant using the cloud service.

9. The encryption key management system of claim 1, wherein a specific category located in the reference layer corresponds to a type of the cloud service.

10. The encryption key management system of claim 1, wherein the key access server is further configured to derive an encryption key using a salt that is set based on a validity duration of the service key, encrypt the service key using the encryption key, and provide the encrypted service key and the salt to the service provision server.

11. The encryption key management system of claim 10, wherein the key access server is further configured to set the salt to a sum of a first value indicating a first current time and a second value indicating the validity duration, and
wherein the service provision server is configured to determine whether the encrypted service key is valid based on a comparison between the salt and a third value indicating a second current time.

* * * * *